US006987795B1

(12) United States Patent
Strutt et al.

(10) Patent No.: US 6,987,795 B1
(45) Date of Patent: Jan. 17, 2006

(54) SYSTEM AND METHOD FOR SELECTING SPREADING CODES BASED ON MULTIPATH DELAY PROFILE ESTIMATION FOR WIRELESS TRANSCEIVERS IN A COMMUNICATION NETWORK

(75) Inventors: Guénaël Thomas Strutt, Lake Worth, FL (US); Pertti O. Alapuranen, Indiatiantic, FL (US)

(73) Assignee: MeshNetworks, Inc., Maitland, FL (US)

( * ) Notice: Subject to any disclaimer, the term of this patent is extended or adjusted under 35 U.S.C. 154(b) by 698 days.

(21) Appl. No.: 10/117,179

(22) Filed: Apr. 8, 2002

(51) Int. Cl.
H04B 1/707 (2006.01)
(52) U.S. Cl. ...................................... 375/140
(58) Field of Classification Search ............... 375/140, 375/146, 147, 144, 148, 295, 316, 346, 348–349; 370/335, 342; 455/504, 505, 506, 134–135
See application file for complete search history.

(56) References Cited

U.S. PATENT DOCUMENTS

| 4,494,192 A | 1/1985 | Lew et al. ................ 364/200 |
|---|---|---|
| 4,617,656 A | 10/1986 | Kobayashi et al. ........... 370/74 |
| 4,736,371 A | 4/1988 | Tejima et al. ................ 370/95 |
| 4,742,357 A | 5/1988 | Rackley ..................... 342/457 |
| 4,747,130 A | 5/1988 | Ho ........................... 379/269 |
| 4,910,521 A | 3/1990 | Mellon ....................... 342/45 |
| 5,034,961 A | 7/1991 | Adams ....................... 375/130 |
| 5,068,916 A | 11/1991 | Harrison et al. ............. 455/39 |
| 5,231,634 A | 7/1993 | Giles et al. ................. 370/95.1 |
| 5,233,604 A | 8/1993 | Ahmadi et al. ............... 370/60 |
| 5,241,542 A | 8/1993 | Natarajan et al. ........... 370/95.3 |
| 5,317,566 A | 5/1994 | Joshi .......................... 370/60 |
| 5,317,593 A | 5/1994 | Fulghum et al. | |
| 5,392,450 A | 2/1995 | Nossen ....................... 455/12.1 |
| 5,412,654 A | 5/1995 | Perkins ...................... 370/94.1 |
| 5,424,747 A | 6/1995 | Chazelas et al. ............ 342/70 |
| 5,502,722 A | 3/1996 | Fulghum .................... 370/69.1 |
| 5,515,396 A | 5/1996 | Dalekotzin ................. 375/206 |
| 5,517,491 A | 5/1996 | Nanni et al. ................. 370/29 |
| 5,555,425 A | 9/1996 | Zeller et al. ................ 395/800 |
| 5,555,540 A | 9/1996 | Radke ....................... 370/16.1 |
| 5,572,528 A | 11/1996 | Shuen ....................... 370/85.13 |

(Continued)

FOREIGN PATENT DOCUMENTS

CA 2132180 3/1996

(Continued)

OTHER PUBLICATIONS

Wong et al., "Soft Handoffs in CDMA Mobile Systems", Dec. 1997, IEEE Personal Communications.

(Continued)

Primary Examiner—Tesfaldet Booure
Assistant Examiner—Khanh Tran
(74) Attorney, Agent, or Firm—Gardner Carton & Douglas, LLP; Joseph J. Buczynski (57) ABSTRACT

A system and method for providing optimum wireless communication spreading code selection such that communication channel interpath interference is minimized. In Direct-Sequence Spread-Spectrum, the autocorrelation properties of a spreading code greatly affects the inherent ability of a system to resist multipath. Low/spreading gain codes (or "short" codes) associated with high data rates do not perform well where large-amplitude multipath is present. The system and method presented herein overcomes this problem by selecting spreading codes in such a way that interference caused by multipath is minimized. The system and method does so by determining the characteristics of the radio-frequency link in order to select a spreading code that will minimize interpath interference.

19 Claims, 4 Drawing Sheets

U.S. PATENT DOCUMENTS

| | | | |
|---|---|---|---|
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/49 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,677,934 A | 10/1997 | Ostman | 375/349 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,710,977 A | 1/1998 | Nakazawa | |
| 5,717,689 A | 2/1998 | Ayanoglu | 370/349 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,884,171 A * | 3/1999 | Tanabe et al. | 455/434 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,229,842 B1 | 5/2001 | Schulist et al. | 375/148 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,269,075 B1 | 7/2001 | Tran | |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,577,671 B1 * | 6/2003 | Vimpari | 375/146 |
| 6,731,622 B1 * | 5/2004 | Frank et al. | 370/342 |
| 6,741,550 B1 | 5/2004 | Shin | |
| 2001/0053699 A1 | 12/2001 | McCrady et al. | 455/513 |
| 2002/0006121 A1 | 1/2002 | George | |
| 2002/0106002 A1 * | 8/2002 | Sun et al. | 370/342 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment", Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

Johnson, I.R. et al., "On Suitable Codes for Frame Synchronisation in Packet Radio LANs;" Vehicular Technology Conference, 1994 IEEE 44$^{th}$ Stockholm, Sweden Jun. 8-10, 1994, New York, NY, USA, IEEE, Jun. 8, 1994 pp. 1421-1424, ISBN: 07-7803-1927-3.

* cited by examiner

SYSTEM AND METHOD FOR SELECTING SPREADING CODES BASED ON MULTIPATH DELAY PROFILE ESTIMATION FOR WIRELESS TRANSCEIVERS IN A COMMUNICATION NETWORK

BACKGROUND OF THE INVENTION

1. Field of the Invention

The present invention relates to a system and method for adapting spreading codes to the transmission channel medium in communication networks. Specifically, the present invention relates to a system and method for selecting an optimum spreading code for Direct-Sequence Spread-Spectrum (DSSS) node communication, based upon information gathered about the radio-frequency link between nodes, such that interpath interference is minimized.

2. Description of the Related Art

Many communication systems employ the use of spreading codes to transmit signals, such as voice, data or multimedia signals between transceivers, or nodes, of a network. In such applications, the narrow-band data transmission signal within the single frequency band is multiplied by a spreading code having a broader band than the user data signal and the user data signal is "spread" to fill the entire frequency band used. As discussed in U.S. Pat. No. 5,515,396 issued to Michael D. Kotzin, which is incorporated herein by reference, the modulation of a signal to be transmitted often includes taking a baseband signal (e.g., a voice channel) having a bandwidth of only a few kilohertz, and distributing the signal to be transmitted over a frequency band that may be many megahertz wide. Although spreading the user data signal may be accomplished by several methods, the most common is to modulate each bit of information, generally after appropriate error correction coding, with a spreading code sequence of bits. In doing so, many bits are generated for each coded information bit that is desired to be transmitted. However, transmissions between transceivers are subject to interference from a number of sources, therefore corrections and compensations must be considered when implementing Direct-Sequence Spread-Spectrum (DSSS) systems.

One such source of interference is multipath propagation between transceivers. Signals propagated along different paths, arrive at the receiver at different times due to variations in transmission delays. As discussed in U.S. Pat. No. 5,677,934, issued to Kjell Ostman, which is incorporated herein by reference, multipath propagation profiles are highly dependent upon the environment of the communication link. As pointed out in Ostman, when the signaling period is long, and delayed copies of the transmitted signals are received with a delay that is long in comparison to the signaling period, multipath propagation compensation is required. Furthermore, in mobile networks, the communications receiver sees rapid changes in phase and amplitude of a received signal and is required to track such changes. Several methods exist for addressing these effects, such as the use of RAKE receivers to collectively assemble transmitted signals. Through the use of a RAKE-receiver algorithm, a complete transmission may be derived from the multiple propagated signals within the receiver.

Multipath interference can also be cancelled through the use of spreading codes when carefully selected to ensure that secondary multipath rays are concurrent with the lowest sidelobe values of the selected spreading code's periodic autocorrelation functions. Accordingly, a need exists for a system and method for the selection of spreading codes for communication, based on information gathered between two nodes, in order to minimize and preferably eliminate multipath interference.

SUMMARY OF THE INVENTION

An object of the present invention is to provide a system and method for determining the Multipath Delay Profile of the communication channel between two nodes in a communication network.

Another object of the present invention is to determine a fitness function for each spreading code based upon the Multipath Delay Profile of a channel used for communication between two nodes of a communication network.

A further object of the present invention is to determine the spreading code with the lowest fitness function based upon the Multipath Delay Profile of a channel used for communication between two nodes of a network, such as a wireless ad-hoc network, thereby minimizing the adverse effects of multipath during wireless communications.

These and other objects are substantially achieved by a system and method which estimates the hypothetical interference levels for all possible spreading codes and determines which code provides the lowest interference level. The system and method first issues a request-to-send (RTS) data packet between two nodes in a communication network using a high spreading-gain code used by all nodes. The RTS data is used to estimate the Multipath Delay Profile (MDP) of the radio-frequency link between nodes and a fitness evaluation of spreading codes based upon the Multipath Delay Profile reveals the optimum spreading code for use with the radio-frequency link. A clear-to-send (CTS) data packet issued from the receiver node to the transmitting node includes information identifying the optimum spreading code to be used by the transmitting node.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE PREFERRED EMBODIMENTS

The selection and use of optimum spreading codes in node communication is a successful approach to reducing multipath interference. In the present embodiment of the invention discussed below, individual nodes are employed having the capability to determine optimum spreading codes during communication.

Figure 1:
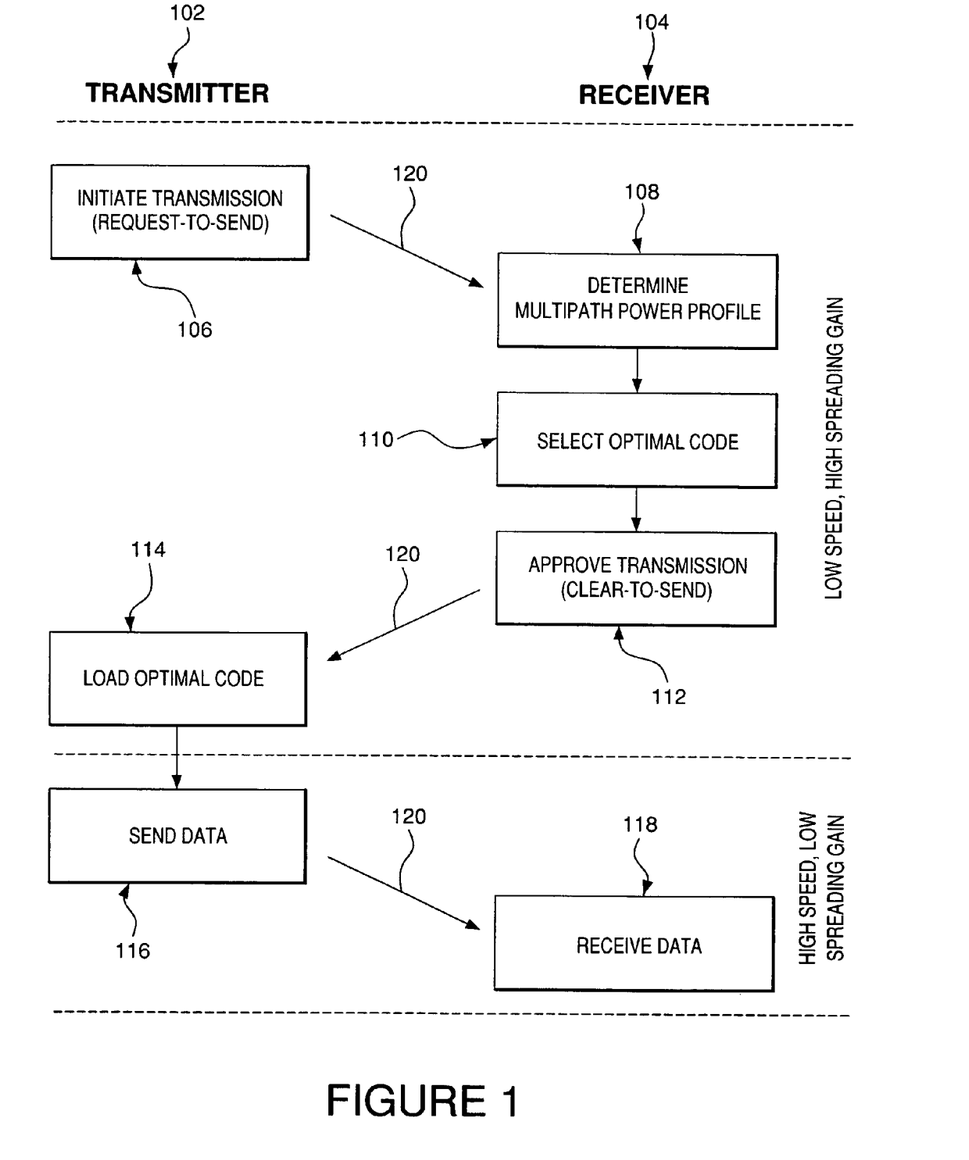
FIG. 1 is a flow diagram illustrating an example of spreading code determination between two nodes of a communication network in accordance with an embodiment of the present invention.
Figure 2:
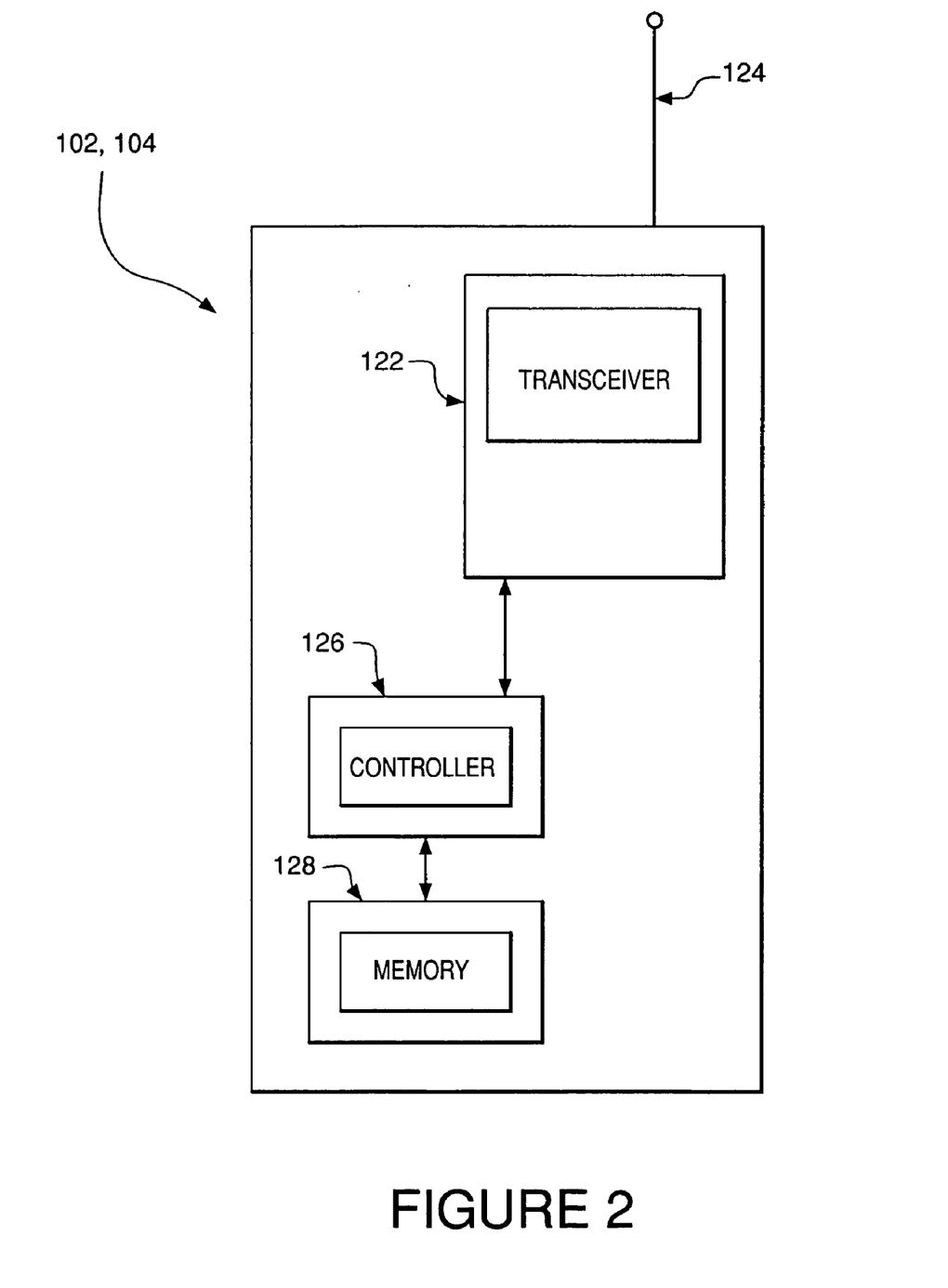
FIG. 2 is a conceptual block diagram of a node shown in FIG. 1.

In an embodiment of the present invention shown in FIG. 1, two nodes 102 and 104 are used to determine, then implement, an optimum spreading code based on transmission channel factors. The nodes 102 and 104 can be employed as mobile nodes or intelligent access points (IAPs) of an ad-hoc wireless communication network, such as those described in U.S. patent application Ser. Nos. 09/897,790, 09/815,157 and 09/815,164, the entire contents of each being incorporated herein by reference. Each of the nodes includes the components necessary to perform all of the following tasks. Specifically, as shown in FIG. 2, each node 102 and 104 includes a transceiver 122 which is coupled to an antenna 124, such as an antenna array, and is capable of receiving and transmitting signals, such as packetized data signals to and from the node 102 or 104 under the control of a controller 126. The packetized data signals can include, for example, voice, data or multimedia. The transceiver 122 can include signal processing components, such as tracking and storing circuitry, and each node further includes a memory 128, such as a random access memory (RAM), that is capable of storing, among other things, routing information pertaining to itself and other nodes in the network.

The evaluation of transmission channel factors between nodes uses two or more nodes with task divisions based upon classification as a receiving node, or a sending node (i.e. receiver or transmitter) as will now be described. In FIG. 1, node 102 is functioning as a transmitter. In another embodiment, node 102 may function as a receiver. Likewise, in FIG. 1, node 104 is functioning as a receiver, however, in another embodiment, node 104 may function as a transmitter.

Initiating spreading code selection begins with a transmission of a request-to-send (RTS) data packet from node 102 to node 104 using a high spreading-gain code as shown at 106. The transmission of the RTS data packet occurs via a transmission channel 120 between transceivers. Based on receipt of the RTS data packet, node 104 determines a Multipath Delay Profile of the transmission channel at 108.

The determination of the Multipath Delay Profile can be achieved by matched-filtering a reference sequence in the RTS, a process made possible by the higher spreading gain of the sequence used. The determination of a Multipath Delay Profile is discussed in U.S. Pat. No. 6,229,842 issued to Schulin et al., which is incorporated herein by reference. Sufficient provisions should be made to determine all major contributing paths in the Multipath Delay Profile, however minor paths, such as those lower than the direct-path component by 10 or more decibels, will have little or no influence on the performance of the system and may be disregarded.

Figure 3:
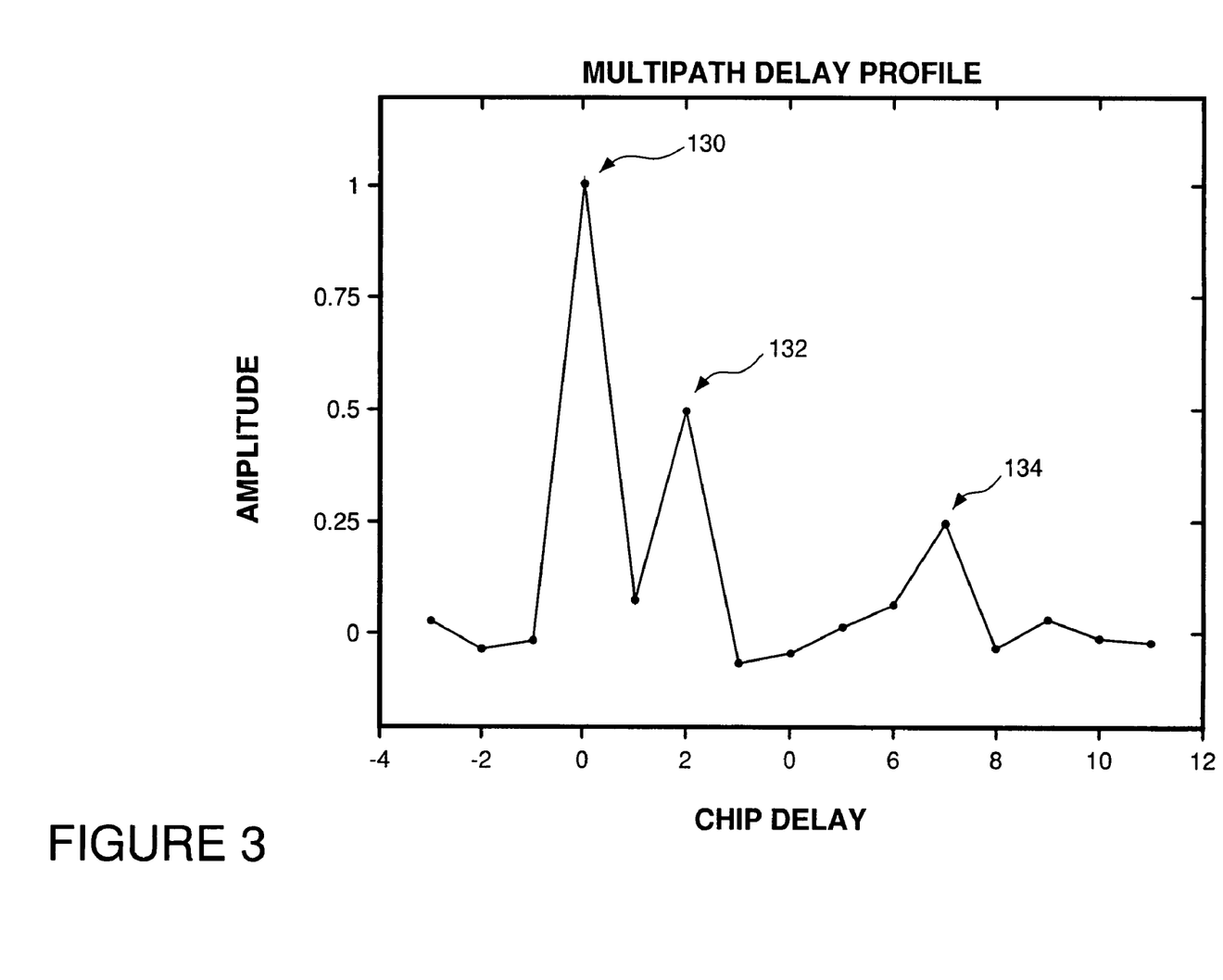
FIG. 3 is a plot illustrating an example of a Multipath Delay Profile estimate.

As shown in FIG. 3, the Multipath Delay Profile is a relation between chip delay and amplitude, indicating paths which potentially will cause the greatest interference. Amplitude peaks are shown occurring at chip delays 0, 2 and 7 at 130, 132 and 134 respectively. The amplitude peak at 130 in all likelihood corresponds to the direct path, because it is the first transmission to reach the receiver. The peaks at 132 and 134 correspond to secondary paths.

As can be appreciated by one skilled in the art, the amount of interference caused by a secondary path is proportional to the product of the interference level estimated by the Multipath Delay Profile, and the periodic autocorrelation sidelobe value of the spreading sequence at the chip delay corresponding to the secondary path. Therefore, the selection of an optimum spreading code requires the estimate of the hypothetical interference levels for all possible spreading codes. Once the levels are known, the spreading code providing the lowest interference level is chosen.

Figure 4:
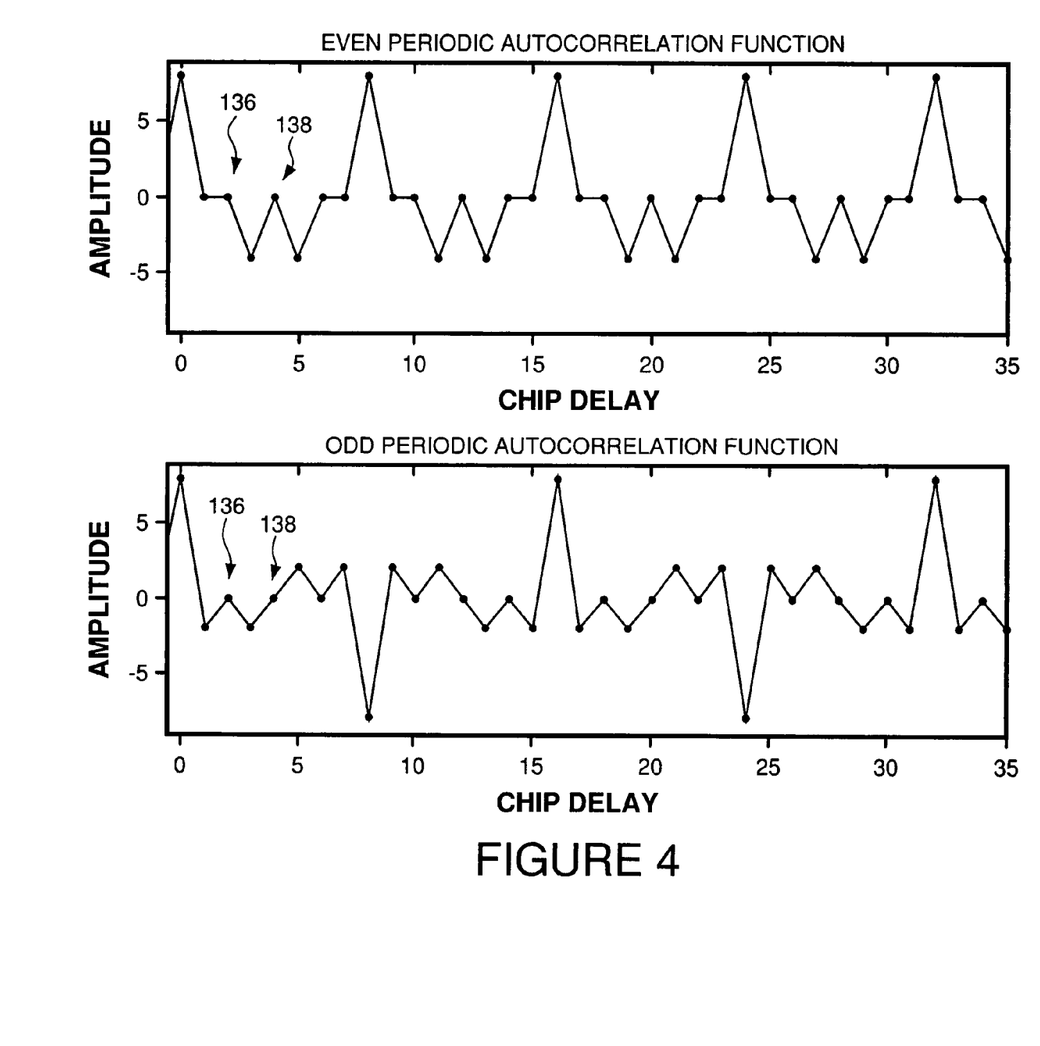
FIG. 4 is a plot illustrating the odd and even periodic auto-correlation functions of an 8-chip sequence.

Each spreading code sequence considered is used to create an "even" and "odd" periodic auto-correlation function (PACF) as shown in FIG. 4. The PACF of a spreading sequence x is defined by the following equation (1), $$\Re_{xx}(k) = \sum_{i=1}^{N} x(i) \cdot x(i-k) \quad (1)$$

where i is the chip-sequence index and N is the length of the spreading code.

In the previous equation (1), the values for x, defined as being the spreading code for $i \in [1,N]$, are understood to be modulo N where, $x(0)=x(N)$ $x(-1)=x(N-1)$ $x(-2)=x(N-2)$ and so forth. This defines what is referred to as the "even" PACF because it assumes that the previous and following symbol is identical. However, the previous and following symbol modulating the spreading sequence may take a difference value. In this case it is necessary to define the "odd" PACF where, $x(0)=-x(N)$ $x(-1)=-x(N-1)$ $x(-2)=-x(N-2)$ and so forth. The two PACF functions can therefore be written as, $$\Re_{xx}^{EVEN}(k) = \sum_{i=1}^{N} x(i) \cdot x^{EVEN}(i-k) \quad (2)$$

$$\Re_{xx}^{ODD}(k) = \sum_{i=1}^{N} x(i) \cdot x^{ODD}(i-k)$$

where $x^{EVEN}$ and $x^{ODD}$ make different assumptions on the way symbols are modulated.

As shown in FIG. 4, the 8-chip sequence (1,−1,1,−1,−1, −1,1,1) has an "even" PACF of (8,0,0,−4,0,−4,0,0). The "odd" PACF for the sequence is (8,−2,0, −2,0,+2,0,+2). Chip-delays ±2 and ±4 at 136 and 138 respectively, are nulls of the function, therefore a signal received with a delay of 2 or 4 (modulo-8) chips will not correlate with the direct path. Given the Multipath Delay Profile of the transmission channel, node 104 calculates a fitness function for each spreading code considered for use with the transmission channel based on the estimated Multipath Delay Profile and PACF of each spreading code. The fitness function for each spreading sequence is defined as:

$$\text{Fitness} = \sum_{k=1}^{N} \left[ MDP(k) \times \left( \frac{|\Re_{xx}^{ODD}(k)| + |\Re_{xx}^{EVEN}(k)|}{2} \right) \right] \quad (3)$$

where $R_{xx}$ is the periodic auto-correlation function of the spreading sequence considered, N is the length of the spreading sequence and MDP is the Multipath Delay Profile of the transmission channel.

As shown in Table 1 below, node 104 is used to evaluate the fitness of each spreading code and the code found to have the lowest fitness will minimize the adverse effects of multipath and provide the best performance. The embodiment of the present invention is shown evaluating code sequences of length 8, although the method may be generalized to code sequences of any length. Also, the embodiment of the present invention is shown evaluating three different code sequences, although the method can be generalized to any number of code sequences.

TABLE 1

Calculation of Fitness Function for All Available Spreading Codes

| Sequence | Autocorrelation | | Fitness Function | |
|---|---|---|---|---|
| 1-11-1-1-111 (shown FIG. 3) | Odd PACF | 8-20-20202 | Mean Sum MDP (Taps) Fitness = 0.25 | 81030301 10.50000.25 X0000000.25 |
| | Even PCAF | 800-40-400 | | |
| -1-1111-1-11 | Odd PACF | 82-4-6064-2 | Mean Sum MDP (Taps) Fitness = 2.25 | 81430341 10.50000.25 X0200000.25 |
| | Even PACF | 80-4000-40 | | |
| -11-1-11-111 | Odd PACF | 8-2020-202 | Mean Sum MDP (Taps) Fitness = 0.75 | 83034303 10.50000.25 X0000000.75 |
| | Even PACF | 8-404-840-4 | | |

FIG. 4 shows a typical auto-correlation function for a sequence of length 8. As illustrated, chip-delays ±2 and ±4 are nulls of the function. Therefore, a signal received with a delay of 2 or 4 (modulo-8) chips will not correlate with the direct path. In accordance with an embodiment of the present invention, this property of direct-sequence spread spectrum (DSSS) modulation is used to minimize interpath interference when spreading codes are selected in accordance with an a priori estimation of the channel.

For instance, in row one of Table 1, spreading code sequence (1,-1,1,-1,-1,-1,1,1) as shown in FIG. 4, has an even periodic auto-correlation function of (8,0,0, -4,0,-4, 0,0) and an odd auto-correlation function of (8,-2,0, -2,0, 2,0,2). The estimated MDP of the communication channel shown in FIG. 3 shows peak values at delays of 0, 2 and 7 at 130, 132 and 134 respectively. The determination of the fitness function from equation (3) yields a value of 0.25. The spreading code sequence considered second in row two of Table 1, spreading code sequence (-1,-1,1,1,1,-1,-1,1), has a fitness function of 2.25, and the third considered in row three of Table 1, has a fitness function of 0.75. Based upon the evaluation, the spreading code of row one, having the lowest fitness function value of 0.25, would be chosen as the optimum spreading code. Node 104 selects this optimum code based on this evaluation, as shown at 110 in FIG. 1, and sends a clear-to-send (CTS) packet at 112, containing information about which spreading code must be used to decode data. The embodiment described above can be used for any direct-sequence spread spectrum system which may use different spreading codes depending on the circumstances.

The system and method presented herein will be effective if the channel information that is estimated by the receiver when the transmission is initiated does not change significantly until the end of the transmission. Thus, the concept of stationarity can be relative to the overall transmission time. A wireless unit, such as a laptop, may be considered stationary or mobile depending on its current utilization, for example, on an office desk or in a vehicle. The decision of whether the unit is stationary or mobile can be made adaptively, for example, with a motion sensor, or repeated channel probes, or a unit can be designated as fixed, such as a base station mounted on a wall, or mobile, such as a personal digital assistant (PDA). However, the embodiment is highly adaptive and can be well suited for units which may be "redeployed" often, such as wireless routers or computers on a desk-devices which may not attain higher data rates because of an adverse multipath environment.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for selecting a spreading code for use in communication between nodes in a communication network based on transmission channel Multipath Delay Profiles, comprising the steps of:
   controlling a first node to send a first data packet to a second node via a transmission channel using a spreading-gain code;
   estimating a Multipath Delay Profile of said transmission channel based on said issued first data packet;
   calculating a fitness function including said Multipath Delay Profile for a plurality of spreading codes of said transmission channel;
   selecting a spreading code from a plurality of spreading codes available for said transmission channel based on said fitness function calculation; and
   controlling said second node to send a second data packet to said first node, said second data packet including information adapted to inform said first node of said selected spreading code, wherein said fitness function corresponds to $$\text{Fitness} = \sum_{k=1}^{N}\left[MDP(k) \times \left(\frac{|\Re_{xx}^{ODD}(k)| + |\Re_{xx}^{EVEN}(k)|}{2}\right)\right]$$

where Rxx is the autocorrelation function of the spreading code considered, N is the length of the spreading code considered and MDP is the Multipath Delay Profile.

2. A method as claimed in claim 1, wherein said estimating of said Multipath Delay Profile includes comparing amplitude versus chip delay.

3. A method as claimed in claim 1, wherein said transmission channel remains substantially constant relative to a rate of transmission.

4. A method as claimed in claim 1, wherein said first data packet includes request-to-send data.

5. A method as claimed in claim 1, wherein said second data packet includes clear-to-send data.

6. A method as claimed in claim 1, wherein said plurality of spreading codes comprises spreading codes suitable for use with said transmission channel.

7. A method as claimed in claim 1, wherein said second node performs said estimate of a Multipath Delay Profile of said transmission channel, said calculation of a fitness function, and said selection of a spreading code.

8. A system for selecting a spreading code for communication between nodes in a communication network based on transmission channel Multipath Delay Profiles, comprising:

a first node, adapted to send a first data packet on a transmission channel using a spreading-gain code; and a second node, adapted to receive said first data packet on said transmission channel, and in response, estimate a Multipath Delay Profile of said transmission channel, calculate a fitness function for a plurality of spreading codes of said transmission channel based on said Multipath Delay Profile, select a spreading code from said plurality of spreading codes of said transmission channel based on said fitness function, and send a second data packet to said first node, said second data packet including information adapted to inform said first node of said selected spreading code, and wherein said fitness function corresponds to $$\text{Fitness} = \sum_{k=1}^{N} \left[ MDP(k) \times \left( \frac{|\Re_{xx}^{ODD}(k)| + |\Re_{xx}^{EVEN}(k)|}{2} \right) \right]$$

where Rxx is the autocorrelation function of the spreading code considered, N is the length of the spreading code considered and MDP is said Multipath Delay Profile.

9. A system as claimed in claim 8, wherein said second node comprises:
an estimator, adapted to estimate said Multipath Delay Profile of said transmission channel based on said first data packet;
a calculator, adapted to calculate said fitness function for said plurality of spreading codes of said transmission channel based on said Multipath Delay Profile; and
a selector, adapted to select said spreading code from said plurality of spreading codes of said transmission channel based on said fitness function calculation.

10. A system as recited in claim 8, wherein said first data packet includes request-to-send data.

11. A system as recited in claim 8, wherein said second data packet includes clear-to-send data.

12. A system as recited in claim 8, wherein said first node is further adapted to utilize said selected spreading code and to send additional data packets on said channel to said second node.

13. A system as recited in claim 8, wherein said optimum spreading code decodes data at a desired rate.

14. A system as recited in claim 8, wherein said transmission channel remains substantially constant.

15. A system as recited in claim 8, wherein said estimate of said Multipath Delay Profile is based on a comparison of amplitude versus chip delay.

16. A wireless communications device, adapted to determine and implement spreading code values, comprising:
a transceiver, said transceiver adapted to send and receive data packets on a transmission channel; and
a controller, adapted to estimate a Multipath Delay Profile of said transmission channel based on a received data packet, calculate a fitness function for a plurality of spreading codes of said transmission channel based on said Multipath Delay Profile, and select a spreading code from said plurality of spreading codes of said transmission channel based on said fitness function, and wherein said fitness function corresponds to $$\text{Fitness} = \sum_{k=1}^{N} \left[ MDP(k) \times \left( \frac{|\Re_{xx}^{ODD}(k)| + |\Re_{xx}^{EVEN}(k)|}{2} \right) \right]$$

where Rxx is the autocorrelation function of the spreading code considered, N is the length of the spreading code considered and MDP is said Multipath Delay Profile.

17. A wireless communications device as recited in claim 16, wherein said data packet includes request-to-send data.

18. A wireless communications device as recited in claim 16, wherein said data packet includes clear-to-send data.

19. A wireless communications device as recited in claim 16, wherein said estimate of said Multipath Delay Profile comprises comparing amplitude versus chip delay.

* * * * *